Jan. 26, 1965 V. J. TAYLOR 3,167,031
MANUFACTURE OF ICE-CREAM
Filed Nov. 14, 1962 3 Sheets-Sheet 1
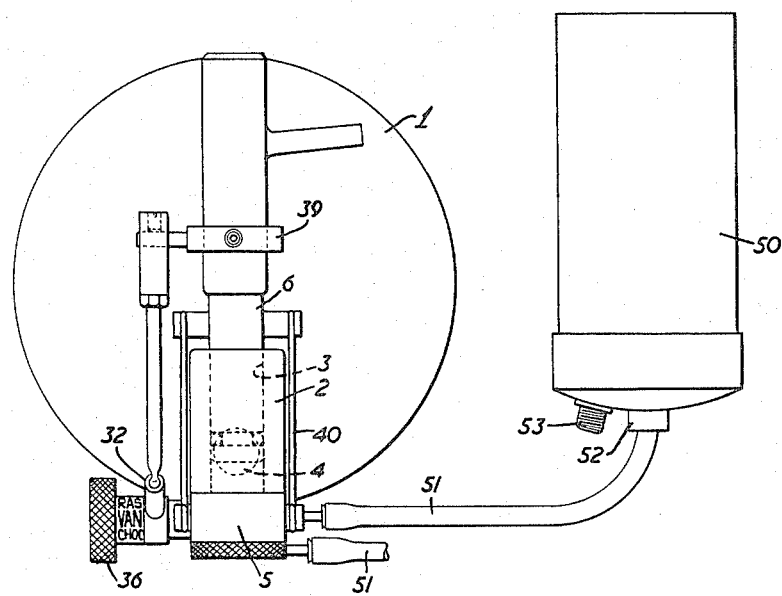
FIG. 1.
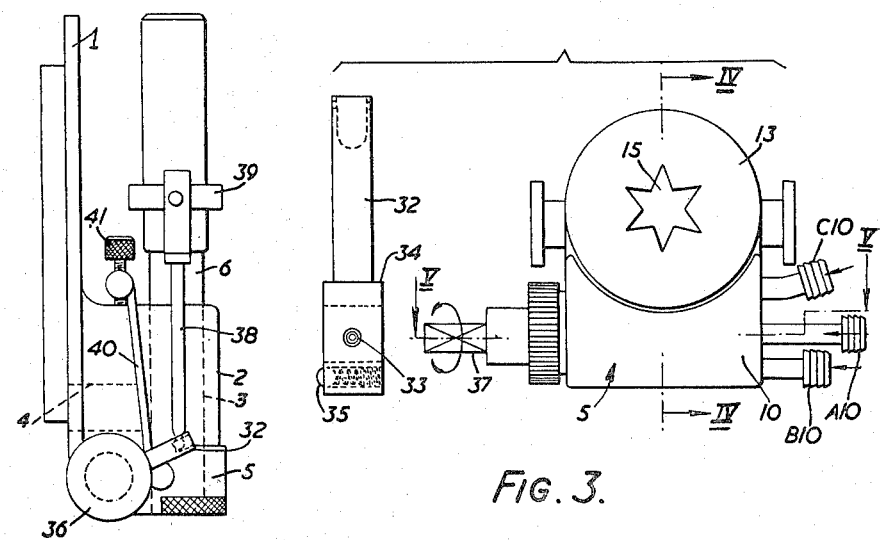
FIG. 2.
FIG. 3.
INVENTOR
Victor John Taylor
BY
Pierce, Scheffler & Parker
ATTORNEYS Jan. 26, 1965 V. J. TAYLOR 3,167,031
MANUFACTURE OF ICE-CREAM
Filed Nov. 14, 1962 3 Sheets-Sheet 2
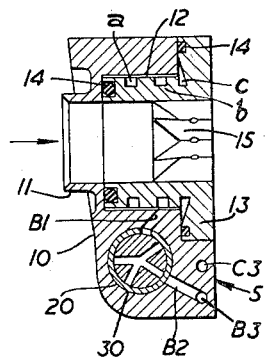
FIG. 4.
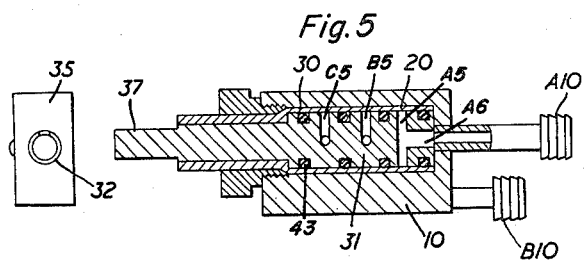
Fig. 5
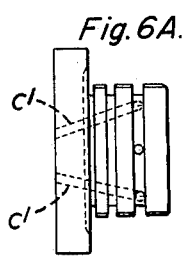
Fig. 6A.
Fig. 6
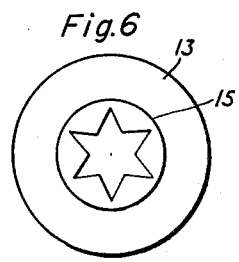
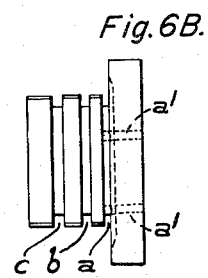
Fig. 6B.
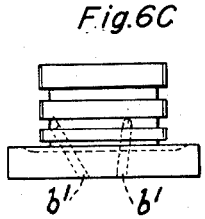
Fig. 6C
INVENTOR
Victor John Taylor
BY
Pierce, Schiffler & Parker
ATTORNEYS Jan. 26, 1965  V. J. TAYLOR  3,167,031
MANUFACTURE OF ICE-CREAM Filed Nov. 14, 1962  3 Sheets-Sheet 3

INVENTOR
Victor John Taylor
BY
Pierce, Scheffler & Parker
ATTORNEYS ated Jan. 26, 1965

3,167,031
MANUFACTURE OF ICE-CREAM
Victor John Taylor, Ruislip Manor, Middlesex, England, assignor to Mister Softee Limited, London, England, a British company
Filed Nov. 14, 1962, Ser. No. 237,699
Claims priority, application Great Britain, Nov. 20, 1961, 41,403/61; Apr. 12, 1962, 14,154/62
2 Claims. (Cl. 107—1)

This invention relates to the manufacture of ice cream and is particularly concerned with an apparatus for introducing stripes of coloured or flavoured material into a stream of extruded ice cream. It is an object of the invention to provide such an apparatus by means of which one or more of a number of coloured or flavoured materials can be introduced according to the wishes of the consumer.

According to one aspect of the present invention, there is provided an attachment for an ice cream extruding apparatus, comprising a body member, said body member having a bore extending through it, means for attaching said body member against an extruding opening of said apparatus with said bore in communication with said opening, said bore having an exit portion the walls of which are fluted longitudinally of said bore, said body member having therein a plurality of apertures admitting to the fluted exit portion of said bore, an inlet for ice cream additive under pressure, settable valve means for controlling at will the communication of said inlet to said apertures, and thereby the introduction of said ice cream additive in stripes to the extruded ice cream.

According to another aspect of the invention, there is provided an attachment for an ice cream extruding apparatus, comprising a body member, said body member having a generally straight bore extending between opposite faces of said body member, means for attaching said body member against an extruding opening of said apparatus with one end of said bore in communication with said opening, said bore having an exit portion the walls of which are fluted in a frame substantially at right angles to the length of said bore, said body member having therein a plurality of sets of apertures admitting to the fluted exit portion of said bore, a plurality of inlets for ice cream additives under pressure, and settable control means for controlling selectively at will the communication of said inlets respectively to said sets of openings and thereby the introduction of said ice cream additives into extruded ice cream passing through said bore.

According to a further aspect of the invention, there is provided an ice cream extruding apparatus, said apparatus having an extruding opening therein for ice cream, extrusion control valve means for controlling the extrusion of ice cream from said opening, a body member detachably connected against an extruding opening of said apparatus, said body member having a bore extending through it with said bore in communication with said opening, said bore having an exit portion the walls of which are fluted longitudinally of said bores, said body member having therein a plurality of apertures admitting to said fluted portion of said bore, at least one inlet on said body member for ice cream additive, at least one container for ice cream additive under pressure, conduit means extending from said container to said inlet, a shut-off valve means associated with said container, settable valve means positioned in said body member for controlling at will the communication of said inlet to said apertures, said extrusion control valve means being coupled to said settable valve means for simultaneous operation, whereby said ice cream additive is added as stripes to extruded ice cream.

Features and advantages of the present invention will appear from the following description of one embodiment, given by way of example only, reference being had to the accompanying drawings in which:

FIGURE 1 is a front elevation of the front plate of an ice cream extruder, with a device according to the invention attached to it;

FIGURE 2 is a side elevation of the front plate and the attached device;

FIGURE 3 shows an underneath view of the extruder head and its actuating lever;

FIGURES 4 and 5 are respectively sections on the lines IV—IV and V—V of FIGURE 3;

FIGURE 6 is a plan view of the extruder nozzle;

FIGS. 6A, 6B and 6C are elevations of the extruder nozzle taken at 90° intervals;

Figure 7:
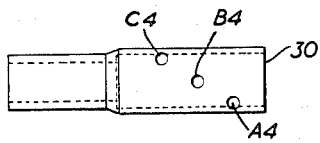
FIGURE 7 shows an elevation of the valve sleeve.
Figure 8:
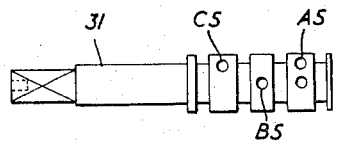
FIGURE 8 shows an elevation of the valve spindle.

Referring to FIGURES 1 and 2, the front plate 1 of the extruder comprises a boss 2 having a discharge bore 3, communicating with a passage 4 extending from the extruder, opening into an extruder head 5 and including a valve 6 to control flow of material from the passage 4 to the head.

The extruder head 5 comprises a one piece body 10 having a neck 11, adapted to be inserted in the discharge bore 3 and sealed by means of a sealing ring (not shown), the body also having a stepped passage 12 which will align with the bore 3. In the stepped passage is threaded an extrusion nozzle 13 having sealing rings 14 and peripheral recesses a, b, c which with the stepped passage define annular galleries around the nozzle, drillings a', b', c' extending from the recesses through the nozzle wall to the nozzle bore 15.

Referring to FIGS. 6, 6A, 6B and 6C it will be seen that the bore 15 is cylindrical at the end of the nozzle innermost in the head and star shaped at the outlet end, the drillings a', b', c' being inclined to the axis and opening at either the peaks or valleys of the star shaped bore. The openings are positioned so as to lie in a transverse plane adjacent the outlet end of the nozzle.

Also in the head is valve bore 20 normal to the stepped passage 12 and communicating with the recesses a, b, c by passages A1, B1, C1, only B1 being shown which open into bore 20 at positions spaced therealong. Also opening into bore 20 are two drillings B2, C2, only B2 being shown, extending from passages B3, C3, each pair of opening B1 and B2 and C1, C2 in the bore 20 being in the same plane normal to the bore axis.

The bore 20 seats sleeve 30 (FIGURES 5 and 7) having one aperture A4, and two pairs of apertures B4 and C4 each pair being in a plane normal to the sleeve axis. Sleeve 30 is rotatable in the bore 20 to bring aperture A4 into register with passage A1, apertures B4 into register respectively with passage B1 and drilling B2 and apertures C4, into register respectively with passage C1 and drilling C2. Within the sleeve is received valve spindle 31 having radial drillings A5, B5 and C5 which on rotation of the spindle relative to the sleeve can, as will appear, be registered with sleeve apertures. An axial drilling A6 communicates with the drillings A5.

Sleeve 30 is made fast to an actuating lever 32 by a grub screw 33 in a bush 34 which has a spring loaded ball 35. The spindle carries a knurled knob 36 either engaging a squared off end 37 of the spindle as shown or being held by an axial grub screw. Knob 36 has dimples each corresponding to a setting of the spindle relative to the sleeve successively engaged by the spring loaded ball upon rotation of the knob, and hence of the spindle relative to the sleeve.

Figure 9:
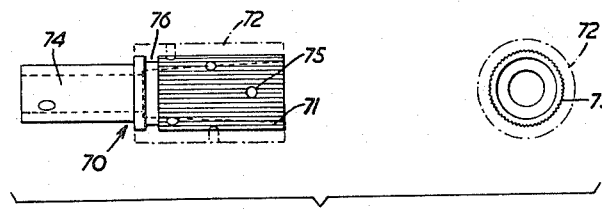
FIGURE 9 shows a side and end elevation of the modified valve sleeve.
Figure 10:
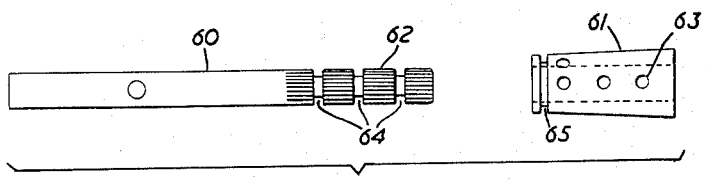
FIGURE 10 shows a side elevation of the components of the modified valve spindle.

A modification of the valve sleeve and spindle assembly is shown in FIGURES 9 and 10.

The modified valve spindle is in the form of a stainless steel shaft 60 which supports and locates a nylon sleeve 61, preferably of poly-tetra-fluoro-ethylene, by means of a splined knurled portion 62 on its outer surface. The sleeve 61 has a tapered outer surface, and has apertures 63, corresponding to apertures A5, B5, C5 in spindle 31, communicative with three annular grooves 64 positioned in the knurled portion of the shaft 60. A groove 65 is provided in the sleeve 61 for location of an O ring.

The modified valve sleeve is in the form of an annular stainless steel member 70 which is provided with a tapered internal bore 71 to accommodate the tapered sleeve 61 of the valve spindle, and which locates and supports a nylon sleeve 72, preferably of poly-tetra-fluoro-ethylene, by means of a splined knurled portion 73 on its outer surface, the sleeve also having a central bore 74 which, in the assembled valve, accommodates the unkurled portion of shaft 60. Drilled in the sleeve 72 and shaft 70 are apertures 75 corresponding to apertures A4, B4, C4 in the valve sleeve 30.

A groove 76 is provided in the shaft 70 for location of an O ring.

Couplings A10, B10, C10 are provided to feed colouring or flavouring to the drilling A6 and galleries B3, C3 respectively, such colourings or flavourings being suitably stored in containers 50 (see FIGURE 1). Each container has a supply line 51 controlled by a shut-off valve 52, and a charging valve 53 by means of which the container can be pressurised by a cartridge of compressed gas, the cartridge being ruptured as it is screwed onto the valve 53.

The actuating lever 32 is pivotally coupled to a rod 38 of adjustable length pivoted to a collar 39 on the stem of extrusion valve 6; thus upward movement of the valve 6 will allow ice cream to be extruded from head 5 and also cause sleeve 30 to rotate angularly.

The head is secured to the boss by a yoke 40 having a set screw 41. O rings such as those shown in FIG. 5 are provided on the spindle and preferably also on the sleeve though no position for the latter is shown.

To set up the extruder the couplings A10, B10, C10 are connected by means of lines 51 to containers of for example strawberry, chocolate, and raspberry syrup. The containers are pressurised in the manner described above, and the shut-off valves opened. Syrup is then fed to the drilling A6, the galleries B3, C3 and drillings B2, C2.

Drillings B1, B2, and C1, C2 are spaced 135° as also are sleeve apertures B4 and C4. On each angular movement of the sleeve by the lever 32, one of each pair of sleeve apertures B4, C4 and aperture A4 are brought into register with the passages B1, C1, A1, while the other of each pair B4, C4 registers with drillings B2, C2; the apertures remain in this position during extrusion, i.e. while valve 6 is in the upper position and move out of register when the valve 6 closes. The spindle moves with the sleeve so that if the spindle drillings were all aligned with the sleeve apertures flavour would be dispensed at each extrusion. However the flavourings can only pass through the spindle if in the case of (B) and (C) two spindle radial drillings B5, C5 are aligned with the sleeve apertures B4 and C4 and in the case of (A) if a radial drilling A5 is aligned with sleeve aperture A4.

The various settings of the radial drillings provide for each of 8 settings of the spindle relative to the sleeve, seven positions allowing passage of one flavour at a time or two flavours at a time through the spindle and sleeve and one position allowing no flavour to pass, this position being used if plain ice cream is required.

The location of the flavouring openings adjacent the outlet of the nozzle assures that the definition of the flavouring stripes introduced into the ice cream is prevented from being affected by excessive contact of the stripes with the walls of the bore.

An extrusion is terminated by the return of valve 6 to its lowermost position and since this causes the sleeve to rotate thus shutting off the passages A1, B1, C1, pressure on any flavour remaining in recesses $a$, $b$, $c$ and drillings $a'$, $b'$, $c'$ is removed and due to the consistency of the syrup and the size of the drillings, no flavour will carry over into the next extrusion if the position for plain ice-cream is selected or only that on those flavours if any of the other positions is selected.

What is claimed is:

1. An attachment for an ice cream extruding apparatus, comprising a body member, said member having a generally straight bore extruding between opposite faces of said body member, means for attaching said body member against an extruding opening of said apparatus with one end of said bore in communication with said opening, said bore having an exit portion the walls of which are fluted in a frame substantially at right angles to the length of said bore, said body member having therein a plurality of sets of apertures admitting to the fluted exit portion of said bore, a plurality of inlets for ice cream additives under pressure, and settable valve means disposed within said body member for controlling selectively at will the communication of said inlets respectively to said set of openings and thereby the introduction of said ice cream additives into extruded ice cream passing through said bore, said settable valve means comprising a first member and a co-operating second, settable, member, said first member being movable from a first, off, position to a second position in which at least one of said inlets is in communication with its associated apertures, said second member preselecting which apertures are in communication with their associated inlets when said first member is in said second position.

2. An attachment for an ice cream extruding apparatus, comprising a body member, said body member having a generally straight bore extending between opposite faces of said body member, means for attaching said body member against an extruding opening of said apparatus with one end of said bore in communication with said opening, said bore having an exit portion the walls of which are fluted in a frame substantially at right angles to the length of said bore, said body member having therein a plurality of sets of apertures admitting to the fluted exit portion of said bore, a plurality of inlets for ice cream additives under pressure, and settable valve means disposed within said body member for controlling selectively at will the communication of said inlets respectively to said set of openings and thereby the introduction of said ice cream additives into extruded ice cream passing through said bore, said settable valve means comprising a first, annular sleeve member and a second, cylindrical spindle member mounted in said sleeve member for rotation relative thereto, said sleeve member being movable from a first, off, position to a second position in which at least one of said inlets is in communication with its associated apertures, said sleeve and spindle members each having a plurality of drillings which on rotation of the spindle member relative to the sleeve member, when in its second position, are brought into register with each other thereby preselecting which apertures are in communication with their associated inlets.

References Cited by the Examiner

UNITED STATES PATENTS

| | | |
|---|---|---|
| 279,131 | 6/83 | Chase. |
| 1,493,082 | 5/24 | Laskey. |
| 2,246,871 | 6/41 | Balch. |
| 2,667,846 | 2/54 | Grumbly. |
| 2,822,112 | 2/58 | Bremer _____ 222—145 |

ROBERT E. PULFREY, *Primary Examiner.*

JOSEPH D. BEIN, *Examiner.*